(12) United States Patent
Bonham et al.

(10) Patent No.: US 6,578,697 B2
(45) Date of Patent: Jun. 17, 2003

(54) ARTICLE SORTING SYSTEM AND METHOD

(75) Inventors: Boyce Dean Bonham, Bono, AR (US); Paul Dewayne Wallace, Bono, AR (US)

(73) Assignee: Hytrol Conveyor Company, Inc., Jonesboro, AR (US)

( * ) Notice: Subject to any disclaimer, the term of this patent is extended or adjusted under 35 U.S.C. 154(b) by 0 days.

(21) Appl. No.: 10/341,058

(22) Filed: Jan. 13, 2003

(65) Prior Publication Data

US 2003/0094346 A1 May 22, 2003

Related U.S. Application Data

(62) Division of application No. 09/808,566, filed on Mar. 14, 2001.

(51) Int. Cl.⁷ .............................................. B65G 47/46
(52) U.S. Cl. .................. 198/370.07; 198/890; 209/916
(58) Field of Search ............................ 198/370.07, 890, 198/360; 209/916, 911, 651, 653, 658

(56) References Cited

U.S. PATENT DOCUMENTS

| | | |
|---|---|---|
| 3,026,988 A | 3/1962 | Fisk |
| 3,045,801 A | 7/1962 | Graybeal |
| 3,515,254 A | 6/1970 | Gary |
| 3,902,592 A | 9/1975 | Buschbom et al. |
| 3,904,077 A * | 9/1975 | Luginbuhl .................. 221/175 |
| 3,955,678 A | 5/1976 | Moyer |
| 4,039,070 A | 8/1977 | Harrison |
| 4,264,002 A | 4/1981 | Van Der Schie |
| 4,501,365 A | 2/1985 | Peyton et al. |
| 4,609,110 A * | 9/1986 | Schulman et al. .......... 209/663 |
| 4,730,718 A | 3/1988 | Fazio et al. |
| 4,732,260 A | 3/1988 | Canziani |
| 4,760,925 A * | 8/1988 | Stehle et al. ................ 209/616 |
| 4,804,078 A | 2/1989 | Scata' |
| 4,957,199 A | 9/1990 | Wokke et al. |
| 5,078,256 A | 1/1992 | Hatano et al. |
| 5,271,703 A | 12/1993 | Lindqvist et al. |
| 5,361,889 A | 11/1994 | Howell et al. |
| 5,620,102 A | 4/1997 | Finch, Jr. |
| 5,628,408 A | 5/1997 | Planke et al. |
| 5,671,837 A | 9/1997 | Tazou et al. |
| 5,720,157 A | 2/1998 | Ross |
| 5,730,279 A * | 3/1998 | Judge ....................... 198/621.1 |
| 5,730,579 A | 3/1998 | Keck et al. |
| 5,823,318 A * | 10/1998 | Baur et al. ................ 198/699.1 |
| 5,921,378 A | 7/1999 | Bonnet |
| 5,950,798 A | 9/1999 | Bonnet |
| 5,977,501 A | 11/1999 | Werkheiser et al. |
| 5,979,633 A | 11/1999 | Bonnet |
| 5,992,609 A * | 11/1999 | Maier ..................... 198/370.08 |
| 6,015,039 A | 1/2000 | Bonnet |
| 6,148,989 A * | 11/2000 | Ecker .......................... 198/387 |
| 6,168,006 B1 | 1/2001 | Bytow |
| 6,189,702 B1 | 2/2001 | Bonnet |
| 6,203,002 B1 * | 3/2001 | Ference .......................... 271/2 |
| 6,208,908 B1 | 3/2001 | Boyd et al. |
| 6,220,421 B1 | 4/2001 | Hugon et al. |
| 6,443,234 B1 * | 9/2002 | Raymond ..................... 171/31 |

FOREIGN PATENT DOCUMENTS

| | | |
|---|---|---|
| DE | 2038620 | 2/1972 |
| FR | 2620053 A1 | 3/1989 |
| FR | 2620054 A1 | 3/1989 |
| JP | 405178451 A | 7/1993 |

* cited by examiner

Primary Examiner—Douglas Hess
(74) Attorney, Agent, or Firm—Alston & Bird LLP

(57) ABSTRACT

The conveyor sorting system and method are provided. The system includes a conveyor for transporting articles along a predetermined path, and a pair of opposing chutes for receiving articles directed from the conveyor by a sorting device having a single paddle. The chutes are in communication with one another so that articles directed into either chute from the conveyor are directed to a common discharge end. In this regard, the single paddle of the present invention is operable to direct consecutively-spaced articles to opposing chutes that lead to the common discharge end.

3 Claims, 3 Drawing Sheets

ARTICLE SORTING SYSTEM AND METHOD

CROSS-REFERENCE TO RELATED APPLICATION

This application is a divisional of U.S. application Ser. No. 09/808,566, filed Mar. 14, 2001, which is hereby incorporated in its entirety by reference.

FIELD OF THE INVENTION

The present invention relates to sorting systems, and more particularly to conveyor sorting systems wherein articles are directed off the conveyor toward a desired location.

BACKGROUND OF THE INVENTION

Systems and methods for sorting articles are generally known and practiced in many forms. A conventional manual sorting system includes a conveyor for transporting packages or articles to laborers or line workers, who physically remove or redirect the articles to a desired location according to a predetermined schedule or predetermined parameters, such as sorting by article description, size, etc. This type of system, however, is slow, labor intensive, and expensive.

More recently, automatic sorting systems have been developed that prove to be much faster and efficient than the manual system described above. Automatic sorting systems typically utilize a conveyor, such as powered rollers or a continuous belt, that directs articles along a path of travel. In order to redirect the articles, one conventional system provides means for lifting the articles off the conveyor and depositing the articles in a desired location. However, these systems are also slow and expensive. Another conventional automatic sorting system provides means for lifting a portion of the conveyor in order to slide the articles off one side of the conveyor to the desired location. These systems are also expensive and cumbersome due to the hydraulic or pneumatic lifting mechanisms utilized in these systems.

A more common conventional automatic sorting system includes means for pushing the articles off the conveyor to the desired location, such as a storage bin, tote, or other conveyor. A plurality of "pushers" act unidirectionally, meaning that the pushing action of each pusher is limited to one direction followed by a recoil or return action to the pusher's initial position before the next pushing action can occur. These systems, however, are also limited in speed or "throughput" because the articles must be spaced far enough apart to allow for the pusher to return to its initial position between each pushing action. This spacing requirement is true regardless of the number of pushers used in a particular system, as the articles must be spaced far enough apart so that subsequent articles are not hit by the returning pushers.

In order to decrease the spacing of the articles on the conveyor, which thereby increases throughput, automatic sorting systems have been developed having sorting devices that utilize a plurality of pushers extending from a rotating continuous belt positioned above the conveyor so that the pushers direct articles off the conveyor in a repeated fashion. Such a system is shown in French Patent 2620-054 to Ritoux ("The French Patent") and Japanese Patent 5-178451 to Sakagami ("The Japanese Patent"). These systems, however, require multiple pushers in each sorting device in order to direct the articles off the conveyor, which adds complexity.

Another problem with these systems is that the systems are designed to push several articles off one particular side of the conveyor. In particular, the advantage stated by the French Patent states that the "ejectors" or paddles "do not need to return to their rest positions after operation," which according to the drawings of the French Patent means that the paddles travel a full revolution for each pushing operation. Indeed, the paddles of the French Patent and the Japanese Patent act as unidirectional pushers that push consecutive articles off only one side of the conveyor. Although the Japanese Patent shows opposing ramps for receiving articles directed from the conveyor, each ramp is provided for receiving a plurality of consecutive articles. In this regard, neither the French Patent nor the Japanese Patent teach or suggest sorting consecutive articles to opposite sides of the conveyor, as doing so would not utilize the multiple paddle feature of these patents. Even if the systems described in the French Patent and the Japanese Patent were operated to sort consecutive articles to opposite sides of the conveyor, these patents do not show any further sorting operations.

Another problem with conventional sorting systems that direct articles off either side of the conveyor is that the articles are sorted to distinct locations even if the sorted articles are the same. For example, articles sorted by a first sorter to one side of the conveyor are often directed to a first storage bin or tote, and articles sorted by a second sorter to the opposite side of the conveyor are directed to a second tote, even if the second sorter is immediately downstream of the first sorter. This creates production difficulties by requiring multiple totes for the same product or products meeting the same parameters.

Yet another problem with conventional sorters is that certain articles, such as thin, flat, or other irregularly shaped articles, are often missed by the pushers or sorters. In particular, these articles are so low that the pushers cannot sufficiently engage the articles to sweep them off the conveyor. Although it is possible to drag the pusher across the conveyor to sweep the articles off the conveyor, this is not desirable due to the resulting high friction built up as well as increased wear on the conveyor and pusher. Yet another problem with conventional sorters is that round or cylindrical articles are difficult or impossible to sort because of their tendency to roll off the conveyor.

Accordingly, there is a need to provide a sorting system that includes a simple sorting device for rapidly sorting articles. There is also a need to sort articles so that the number of totes for receiving the articles is minimized. Further, there is a need to differentiate and sort articles according to a particular requirement or condition so that the articles can be sorted into the desired locations. Further still, there is a need to provide a sorting system and a method for sorting articles wherein a wide variety of objects, including round, cylindrical, or flat articles can be easily sorted.

SUMMARY OF THE INVENTION

These and other needs are provided, according to the present invention, by a sorting system comprising a sorting device having a single, double-sided paddle for directing articles off either side of the conveyor. Advantageously, the spacing between the articles on the conveyor is substantially less than conventional systems, which thereby allows for greater throughput. Further, the articles sorted to either side of the conveyor are directed towards a common tote. Thus, substantially fewer totes are required for the sorting system of the present invention, which results in greater efficiency and utilization compared to conventional systems.

In particular, the present invention provides a sorting system comprising a conveyor, such as a continuous conveyor belt, that transports articles along a path of travel. The conveyor can be one of many conventional conveyors that are known in the art, and in one embodiment the conveyor includes an external surface having a plurality of raised portions, such as cleats, extending therefrom so that articles placed on the conveyor can be easily directed off the conveyor. At least one pair of opposing chutes are positioned along the conveyor that are sized for receiving the articles. Advantageously, the chutes are in communication with one another, so that articles directed into either chute are directed towards a common discharge end. In one embodiment, the common discharge end includes a discharge wall that is in selective communication with the chutes and can be pivoted or positioned from a discharge position to a storage position, as discussed below.

The sorting system of the present invention also includes a sorting device having a paddle for directing the articles from the conveyor to the chutes. More specifically, the paddle includes a first side and a second side that are operable to engage the articles so that the articles are directed from the conveyor to a respective chute. In one embodiment, the paddle includes a brush that can be in contact with the conveyor to ensure that particular articles, such as small, thin, or flat articles, are directed or swept off the conveyor into the chutes. The brush is particularly useful in combination with the cleated external surface of the conveyor, as the brush conforms to the surface of the conveyor and thereby ensures that these articles as well as cylindrical, round, and irregularly articles are directed from the conveyor. Advantageously, the paddle of the present invention can direct articles from either side of the conveyor without returning to an initial position between directing consecutive articles. In this manner, the sorting system of the present invention allows for substantially greater throughput than conventional systems.

The sorting device also includes a drive source for directing the paddle into engagement with the articles. In a presently preferred embodiment, the drive source is a pneumatic device that is operably connected to the paddle and which directs the paddle between a first position and a second position quickly and precisely. The drive source is operably connected to a detector, which detects the presence of an article at a particular point along the path of travel. The term "detector" is meant to be interpreted broadly, and preferably comprises a light-detecting device, such as a photocell, bar-code reader, or a color-code reader, that is known in the art.

As mentioned above, the pair of chutes according to the present invention are positioned across the conveyor from one another and are in communication with a common discharge end. More specifically, the chutes are preferably positioned opposite one another along the path of travel so that articles can be directed from the conveyor by the paddle. However, the chutes do not have to be directly opposite one another, as long as the chutes remain in communication with one another and have a common discharge end. According to a presently preferred embodiment, the common discharge end includes a pivotable discharge wall that is pivotable between a discharge position and a storage position. An actuator, such as a pneumatic or hydraulic piston, is preferably provided for moving the discharge wall between the discharge position and the storage position.

In one embodiment, a cover layer is attached to at least one of the chutes for assisting in directing the articles to the common discharge end. The cover layer is preferably formed of a low-friction, polymeric material and extends substantially the length of the chute. In this regard, the cover layer provides a relatively smooth path for the articles as they move towards the discharge end.

Associated methods are also part of the present invention. According to one method of the present invention, a method of sorting an article from a conveyor is provided comprising directing or transporting the article along a path of travel, detecting the article at a point along the path of travel, and directing the article from the conveyor to one of a pair of opposing chutes. As described above, the chutes are in communication with one another and have a common discharge end. Advantageously, the method provides a simple process for rapidly sorting items with fewer components, which increases line throughput.

Another method of sorting articles from a conveyor is provided comprising directing articles along a path of travel and directing a first article through a first chute to a tote by engaging the article with a first side of a paddle. In particular, the paddle moves from a first position to a second position in order to direct or sweep the article from the conveyor. The method also includes directing a second article along a second chute to a tote by engaging the article with the second side of the paddle, wherein the paddle moves from the second position to the first position. In one embodiment, the first article and the second article are directed into the same tote.

Accordingly, and as is explained in more detail below, the present invention provides a system and methods for sorting articles from a conveyor that overcomes the disadvantages of conventional sorting systems. The present invention is particularly advantageous for sorting small articles, such as nail polish bottles, combs, toothbrushes, and small electronics. The new system provides fast and efficient sorting by utilizing a single paddle or paddle to sort articles off either side of the conveyor, which allows for significantly increased throughput compared to conventional systems. Further, the new system directs articles from either chute to a common discharge end so that articles sorted from either side of the conveyor can be directed to the same tote, which significantly reduces complexity and improves efficiency.

BRIEF DESCRIPTION OF THE DRAWINGS

Figure 1:
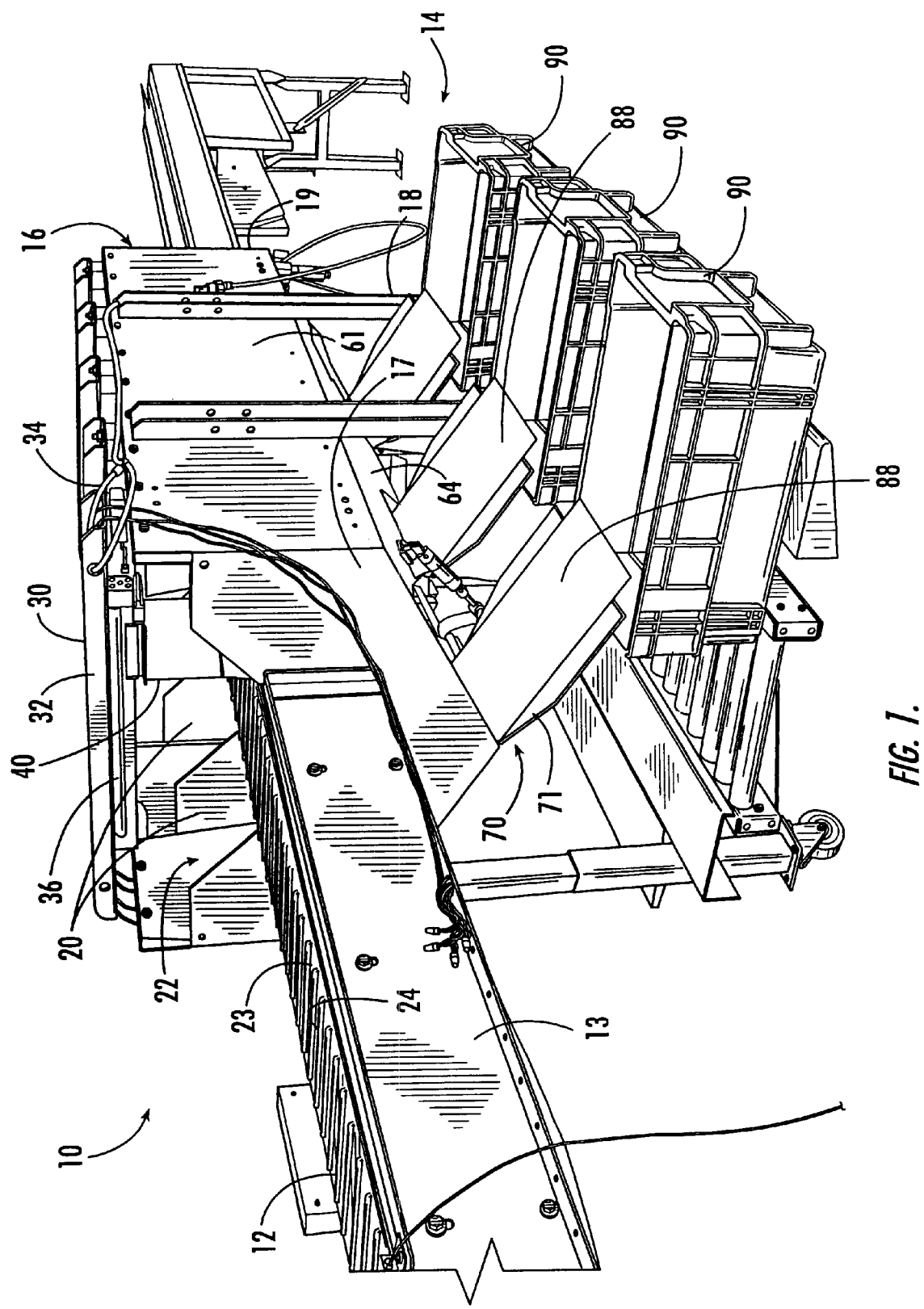
Figure 3:
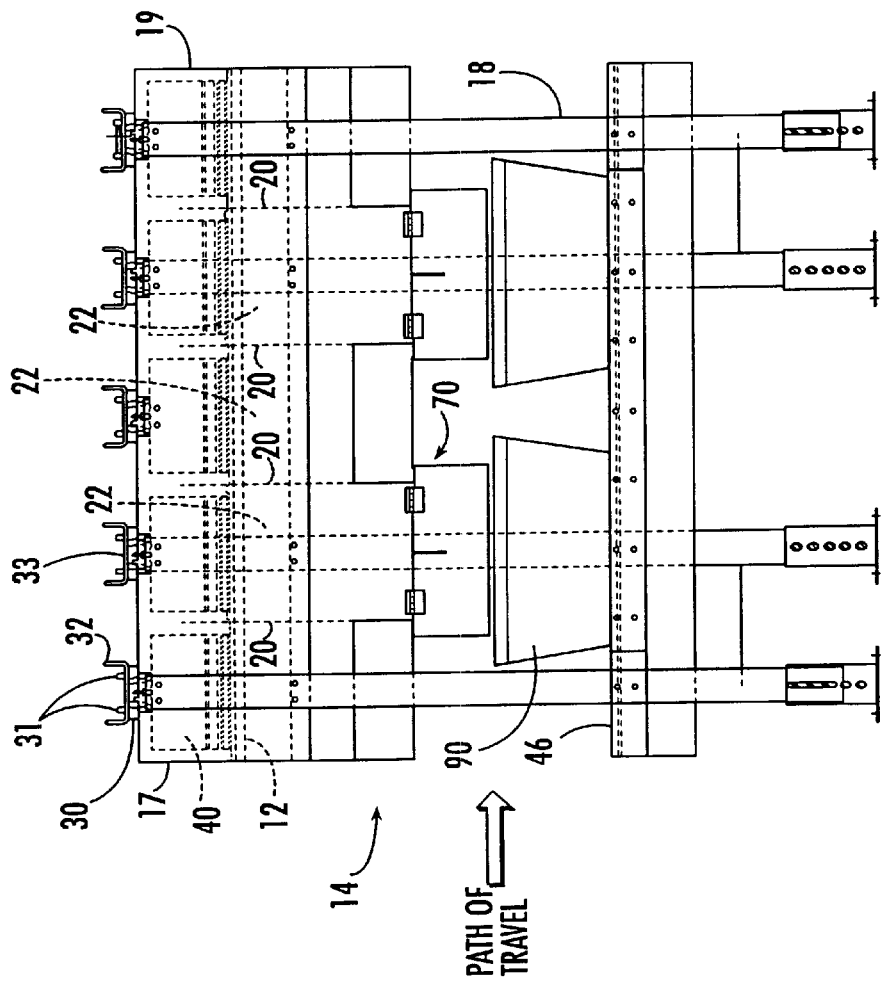
Figure 2:
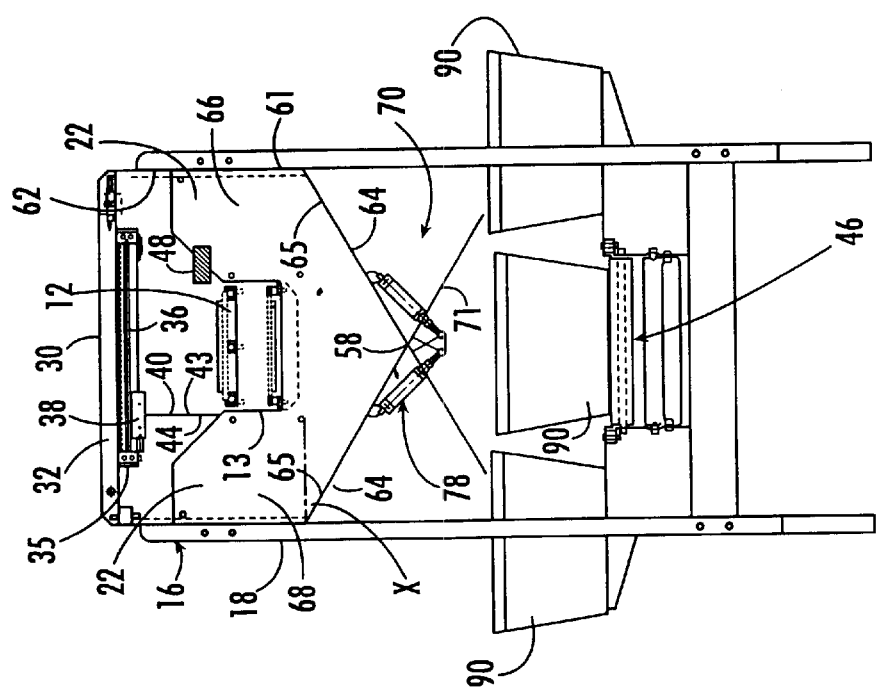
Figure 5:
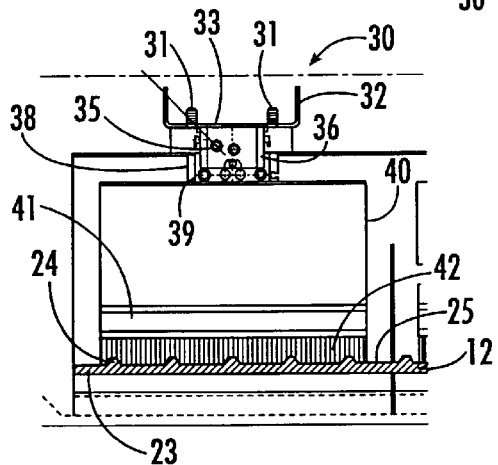
Figure 4:
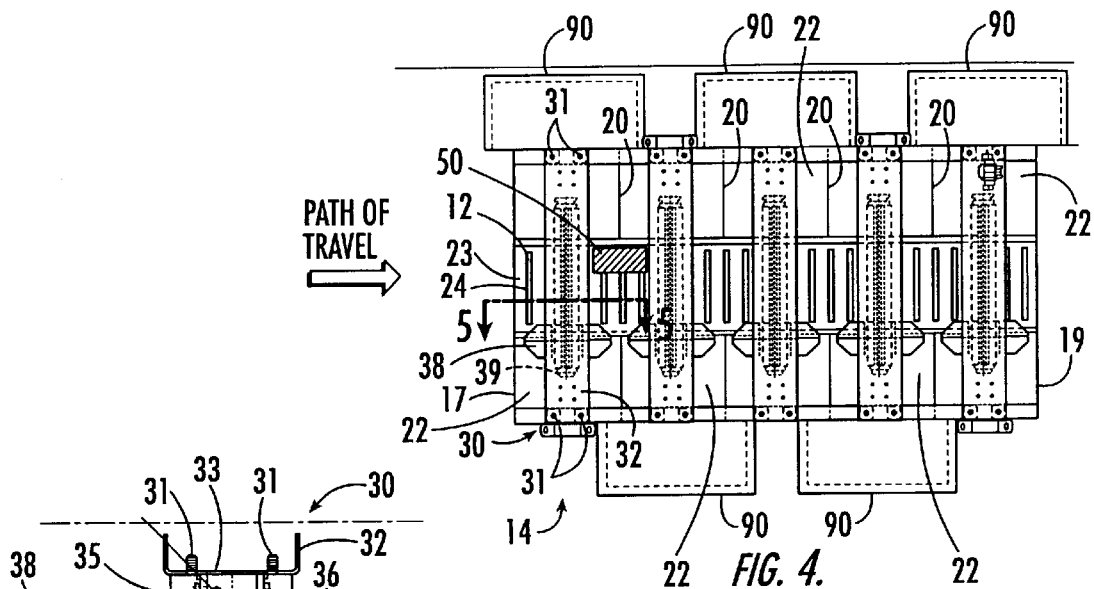
Figure 6:
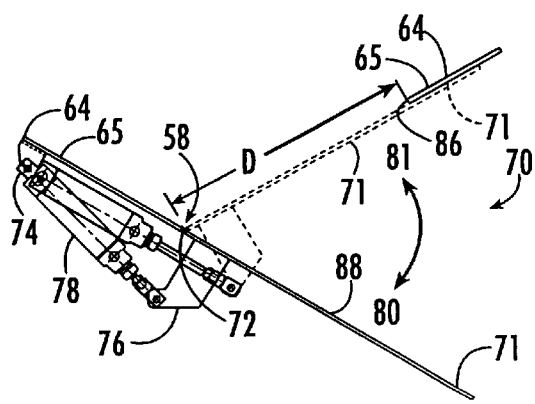

Having thus described the invention in general terms, reference will now be made to the accompanying drawings, which are not necessarily drawn to scale, and wherein:

FIG. 1 is a perspective view of a conveyor sorter system according to one embodiment of the present invention;

FIG. 2 is a end elevational view of a conveyor sorter system according to the present invention;

FIG. 3 is a side elevational view of a conveyor sorter system according to the present invention;

FIG. 4 is a top elevational view of a conveyor sorter system according to the present invention;

FIG. 5 is a greatly enlarged cross-sectional view of a portion of a conveyor sorter system taken along lines 5—5 of FIG. 4; and FIG. 6 is a greatly enlarged end view of a portion of a conveyor sorter system according to the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring first to FIGS. 1–4, a new conveyor sorting system 10 is provided by the present invention for quickly and efficiently sorting items from a conveyor to a desired location, such as a bin, storage tote, or downstream conveyor. In particular, the system 10 comprises a conveyor 12, such as a continuous conveyor belt defining a pair of opposing sides, that is supported by rails 13 so that the conveyor travels along a predetermined path. In most cases the predetermined path will be rectilinear, although the path may also comprise curves and bends depending on the particular needs of the system. The conveyor 12 is operable to transport or direct articles of various shapes and sizes along a path of travel defined by the conveyor. The system 10, however, is particularly advantageous for sorting uniquely shaped articles, such as nail files, toothbrushes, small electronics, cylindrical tubes and the like. These articles are typically thin or flat, or may have a tendency to roll, and have been shown to be particularly difficult to sort using conventional systems and methods. The present system 10, however, is designed to easily sweep or sort these articles from the conveyor 12, as explained more fully below.

The conveyor 12 is a plastic, rubberized, or coated belt that provides sufficient friction with articles placed thereon, and as shown in FIGS. 1 and 4 can include a plurality of raised portion or cleats 24 that are defined by the outer surface 23 of the conveyor. The cleats 24 can have a rectilinear or curved shape, and the cleats extend across the conveyor 12 generally perpendicular to a predetermined path of travel and define a plurality of valleys 25 (FIG. 5) between the cleats. In this regard, the cleats 24 can support large or thin articles above the valleys 25 so that the articles can be more easily removed. In addition, the cleats 24 provide support boundaries for smaller articles or rounded articles, such as shampoo, hairspray, or medicine bottles, that may otherwise roll off the conveyor 12.

The system 10 also includes a sorting area 14 positioned along the predetermined path. In a presently preferred embodiment, the sorting area 14 includes a "V"-shaped outer housing 16 that is connected to the rails 13 and a plurality of external supports 18 such that the sorting area at least partially surrounds the conveyor 12. More specifically, the outer housing 16 includes a front wall 17, a rear wall 19, side walls 61 and lower walls 64. In one embodiment, the lower walls 64 converge at an angle X to form the lower portion of the "V" shape. Angle X can be in the range of about 5–60° from horizontal, and preferably is about 30°.

The sorting area 14 also includes a plurality of dividers 20 that are disposed at spaced intervals along the predetermined path of the conveyor 12 between the front wall 17 and the rear wall 19. In one embodiment, the dividers 20, the front wall 17, and the rear wall 19 all have a generally "V" shape for ease of manufacturing and appearance, although this is not required. Preferably, the dividers 20 extend from the rails 13 supporting the conveyor 12 to the inner surface 62 of the side walls 61 and the inner surface 65 of the lower walls 64 to define a plurality of bins or chutes 22 adjacent the conveyor. More specifically, the chutes 22 are divided into opposing pairs of chutes comprising a first chute 66 and a second chute 68 that define inlets defined by the dividers 20 (or the front wall 17 or rear wall 19 depending on the location of the chutes), the inner surface 62 of the side walls 61, the inner surface 65 of the lower walls 64, and the rails 13. Thus, articles being directed from the conveyor 12 fall into either the first chute 66 or second chute 68. Advantageously, the first chute 66 and second chute 68 define outlets that are in communication with one another so that articles sorted into either the first chute or the second chute are directed toward a common point or intersection 58 formed by the converging lower walls 64.

The sorting area 14 also includes a plurality of sorting devices 30 that are preferably attached to the housing 16 and positioned above the conveyor 12 such that the number of sorting device 30 corresponds to the number of pairs of opposing chutes 22 spaced along the predetermined path. In particular, each sorting device 30 includes an upper member 32 that is positioned substantially perpendicular to the predetermined path and is connected to the housing 16, such as by a nut and bolt combination or similar fastener. In addition, vibration dampeners 31 (see FIGS. 4 and 5) can be added as well where the upper member 32 is attached or connected to the housing 16. In one embodiment, the upper member 32 includes a piston 36 that is slidably connected to a support channel 33 defined by the upper member, as discussed below. Alternatively, the support channel 33 could be a separate piece from the upper member 32.

The sorting device 30, which is preferably a "rodless cylinder" or "band cylinder" that can be commercially purchased, also includes a shuttle 38 that is attached to the piston 36 so that both the shuttle and piston are movable across the conveyor 12. More specifically, the piston 36 is connected to the shuttle 38 through a slot (not shown) running the length of the support channel 33. A seal, such as a rubber seal, is disposed in the slot so that the slot is closed except where the piston 36 and shuttle 38 attach. The piston 36 is controlled by a drive source 34, which can be pneumatic, hydraulic, mechanical, electrical, or other type of drive source known in the art. In a presently preferred embodiment, the drive source 34 is a high-pressure air source that is operably connected to and in selective communication with the piston 36 via a valve 35 that is positioned in the support channel 33. In this regard, the drive source 34 is operable to move the piston 36 and the shuttle 38 across the conveyor 12. In addition, vibration mounts 39 are positioned adjacent the shuttle 38 to limit unwanted movement of the shuttle. Although the shuttle and drive source according to one embodiment of the present invention have been shown and described, many other types of drive systems known in the art could be used, such as those used with conventional air cylinders with external carriages.

As shown best in FIG. 5, the sorting device 30 also includes a single plow or paddle 40 that is connected to the shuttle 38 and extends therefrom towards the conveyor 12. The paddle 40 is preferably formed of a rigid or semi-rigid material, such as plastic or metal, and in one embodiment includes a brush 42 at a distal end 41 for improving the contact between the paddle and the conveyor 12. In a presently preferred embodiment, the brush 42 includes a plurality of bristles formed from a polymeric material, although other material, such as natural fibers, could also be used. Accordingly, the paddle 40 is capable of directing articles from the conveyor 12 into the chutes 22. Advantageously, the paddle 40 includes a first surface 43 and a second surface 44 that can each be utilized for engaging the articles and sweeping or directing the articles into the first chute 66 and the second chute 68, respectively. As shown, the first surface 43 and the second surface 44 are substantially planar, although the surfaces can be of other shapes, such as contoured, curved, etc., in order to assist with engagement of the articles. In this manner, the shuttle 38 is operable to sort articles from either side of the conveyor 12, which greatly improves the throughput capacity of the system 10 compared to conventional sorting systems since the articles can be spaced closer together on the conveyor.

For example, in a hypothetical conventional system having a single-sided pusher, articles must be spaced about 24 inches apart along the predetermined path of the conveyor so that the pusher can push an article off the conveyor and have time to return to its initial position so that the next pushing action can be performed. By contrast, the shuttle 38 of the present invention does not have to return to an initial position between each pushing or directing action, so that articles can be spaced closer together on the conveyor 12. In the above example with all other factors being equal, articles could be spaced 12 inches apart or less, which effectively doubles the throughput of the system 10 at any given conveyor speed.

The system 10 also includes a detector 48 that is operably connected to the sorting device 30. The detector 48, which can be one of many types of detectors known in the art, such as a light-detecting device or photocell, bar-code reader, or similar device, detects the presence of an article or the presence of a "sort" indicator and relays an appropriate signal to a processor (not shown) that controls the drive source 34 and thus the piston 36 and shuttle 38. In one embodiment, the detector 48 can also emit a beam that is designed to be broken by the presence of an article. When the beam is broken, the detector sends an appropriate signal to the processor for determining whether a sorting action is required by the sorting device 30. In another embodiment, the detector 48 is a bar-code reader that is operable to read a bar-code placed on an article itself or on the conveyor 12 corresponding to the article, and relay the information to the processor for determining if a sorting action is required. In yet another embodiment, the detector 48 is a color-code detector operable to detect color that is present on an article or, preferably, on the surface of the conveyor 12 corresponding to the article. In this embodiment, the conveyor 12 includes at least one colored region 50 (FIG. 4) that is correlated or assigned to a particular product, such that the sorting action for the product is determined based on the color detected by the detector 48.

As mentioned above, the system 10 includes a plurality of opposing chutes 22 spaced along the predetermined path of travel. The term "opposing" is meant to be interpreted broadly, such that the first chute 66 and the second chute 68 do not have to be parallel with one another in respect to the predetermined path, as long as the first and seconds chutes are in communication with one another. As shown best in FIGS. 1, 3, and 6, each pair of chutes 22 defines a common discharge end 70 for allowing the articles sorted into the first chute 66 and the second chute 68 to be directed to a desired location, such as a storage bin, tote, or downstream conveyor. In this regard, the first chute 66 defines an opening 86 in the lower wall 64 extending a distance D from the intersection 58 of the lower walls of the first chute and the second chute 68 to a point along the lower wall of the first chute. The opening 86 may also extend substantially the width of the first chute 66 defined as the distance between the dividers 20 (or between a divider and either the front wall 17 or the rear wall 19 in the case of the outermost chutes), although this is not required. In addition, the shape of the opening 86 can be of any shape sufficient to allow articles to pass therethrough, and can include beveled or sloped surfaces to facilitate easier passage into the opening.

The sorting area 14 also includes a discharge wall 71 that is movably or pivotally connected to the housing 16 at the intersection 58 of the converging lower walls 64 by a hinge 72 or similar device. The discharge wall 71 is preferably planar and is sized to cover the opening 86 defined by the first chute 66. The discharge wall 71 is pivotable between a discharge position 80 and a storage position 81. Alternatively, the discharge wall 71 may be selectively pivotable between a plurality of elevations to allow products or articles to fall into specific totes. To facilitate movement of the discharge wall 71, an actuator 78 is connected to a pair of brackets 74, 76 extending from the lower wall 64 of the second chute 68 and the discharge wall 71, respectively (see FIG. 6). The actuator can be one of many actuators known in the art, and is preferably a hydraulic or pneumatic actuator, such as a pneumatic cylinder actuator manufactured by SMC Pneumatics of Indianapolis, Ind. Other types of actuators can also be used, such as electromechanical linear actuators or linear solenoids. The actuator could also be a bias member, such as a spring. The discharge wall 71 can be positioned in other ways as well. For example, the discharge wall could be pivotally connected at the top of the opening 86 instead of at the intersection 58 of the lower walls 64. Alternatively, the discharge wall 71 can be stationary or completely removed to expose the opening 86.

When the discharge wall 71 is in the discharge position 80, the discharge wall forms a pathway in communication with the first chute 66 and the second chute 68 so that articles can be directed from the chutes to a desired location, such as a tote 90 shown in the Figures. In particular, the pathway formed by the discharge wall allows articles directed into the second chute 68 to slide or tumble through the chute and opening 86, and down the discharge wall 71 into the tote 90. Similarly, articles directed into the first chute 66 slide or tumble through the chute and fall through the opening 86 defined therein to the discharge wall 71 and tote 90. In this regard, the discharge end 70 is common to both the first chute 66 and the second chute 68.

The discharge wall 71 can also be pivoted to the storage position 81, which acts to hold or store any articles that are directed into the chutes 66, 68 while the discharge wall is in the storage position. In particular, the discharge wall 71 covers the opening 86 when the discharge wall is in the storage position so that articles cannot escape or be directed to the tote 90. This feature is particularly advantageous when the tote 90 becomes full or when a desired number of articles have been sorted to the tote, because the sorting action of the system 10 can continue while one tote is exchanged for another tote. During this time the discharge wall 71 remains in the storage position 81 and articles are collected in the chutes. When the new tote is ready, the discharge wall 71 can be pivoted to the discharge position 80 so that articles stored in the chutes are released to the tote. The actuator 78 that controls the pivoting operation of the discharge wall 71 can be manually operated, such as by an operator-controlled switch, or can be automatically controlled, such as by the processor described above.

To facilitate easy transfer of the articles through the chutes, a liner 88 is attached to the first chute 66 and the second chute 68. The liner 88 preferably is formed of a flexible polymeric material, such as woven nylon or polyester, having a low coefficient of friction. The liner 88 could also include padding (not shown), such as foam, to prevent fragile products from being damaged as they travel through the chute. In one advantageous embodiment shown in FIG. 2, the liner 88 attached to the second chute 68 extends along the discharge wall 71 as well so that articles can easily slide or tumble along the liner to the tote 90.

As described above, the discharge end 70 is operable to direct articles to a desired location, such as to the tote 90. FIG. 2 shows an end view whereby several totes are spaced proximate the sorting area 14 along the predetermined path so that each tote corresponds to a respective discharge end 70. In particular, the tote 90 is positioned adjacent the respective discharge end 70 such that when the discharge wall 71 is in the discharge position 80 the tote is in communication with the chutes 66, 68. Advantageously, the system 10 of the present invention requires only half as many totes per sorting action as conventional systems since the opposing first and second chutes 66, 68 share the discharge end and tote 90. In addition, the discharge ends are positioned in an alternating pattern along the predetermined path so that the tote size can be about 1.5 times the width of the chutes, which improves efficiency. It is also beneficial to alternate the discharge ends in order to avoid the external supports 18 of the housing 14. However, the system 10 can also be designed to include discharge ends only on one side or directly below the conveyor 12.

In one embodiment, the sorting area 14 also includes a take-away conveyor 46 positioned below the conveyor 12 for transporting totes to a desired location. For example, when the tote 90 is full, it can be placed on the take away conveyor 46, which can be a continuous belt-type conveyor, roller conveyor, or the like, and directed to a downstream location, such as a shipping department, inspection area, or further processing station.

In operation, articles are placed on the conveyor 12 and the conveyor is set in motion such that the articles are directed along a path of travel corresponding to the predetermined path. At a predetermined point along the path of travel, such as when the article is proximate a sorting device 30, the presence of the article is detected by the detector 48 in a manner described above or a similar manner thereto. The signal from the detector 48 is sent to the processor, which determines whether a sorting action is required for the particular article. If the processor determines that the article is not to be sorted, the sorting device 30 receives no signal or a "hold" signal from the processor such that the shuttle 38 remains on a first or initial side of the support channel 33 and thus does not move across the conveyor 12.

If the article is to be sorted into a tote, however, the processor sends a signal to the drive source 34 such that the piston 36 and shuttle 38 are moved along the support channel 33. In this manner, the paddle 40 connected to the shuttle 38 engages the article and directs the article from the conveyor 12 into either the first chute 66 or the second chute 68. When the sorting action is complete, the shuttle 38 stops at a second position, such as at one end of the support channel 33 across the conveyor 12 from the first position of the shuttle. Advantageously, the shuttle 38 and paddle 40 are ready to immediately engage the next detected article. If it is determined that the next detected article is to be sorted by the same sorting device 30, a signal is sent from the processor as described above to the sorting device 30 so that the shuttle 38 is directed back across the support channel 33 from the second position to the first position to direct the article off the conveyor 12 into the adjacent chute. The process can then be repeated for as long as it is determined that articles are to be sorted by that particular sorting device. Advantageously, all of the articles directed to either chute associated with the sorting device are directed to the same discharge end.

As mentioned above, the detector 48 can be a color-reading device used in conjunction with color-coded articles or a colored portion or region 50 on the conveyor 12. To illustrate this embodiment, a specific type of article, such as combs, can be assigned to and placed on a particular colored portion or region 50 of the conveyor 12, such as a green colored region. The colored region 50 is located on the conveyor 12 so that it is visible to the detector 48. As the conveyor 12 moves the combs along the predetermined path of travel, the detector 48 detects the colored region 50 of the conveyor and relays a signal corresponding to that particular color (green, in this example) to the processor. The detector 48 may also be used with another detector, such as a photocell, so that the colored region of the conveyor as well as the article itself are detected. The processor then determines if that sorting device 30 is designated to sort items assigned to the green colored region of the conveyor. If yes, the processor sends an appropriate signal as described above to the sorting device 30 via the drive source 34 to sort or direct the items corresponding to that particular color off the conveyor 12 and into the chutes. Advantageously, the paddle 40 of the sorting device 30 can move across the conveyor 12 to direct consecutively spaced articles into the first and second chutes 66, 68 toward the common discharge end 70. As such, articles can be sorted off either side of the conveyor 12 and be directed to the same tote 90 by the paddle 40 of a single sorting device 30, which allows for greater throughput and efficiency.

As shown in the Figures, the system 10 of the present invention can include a plurality of sorting devices and detectors. In this regard, each detector can operate in a manner described above so that appropriate "sort" signals are sent by the processor to a corresponding sorting device.

Alternatively, the system 10 may only include a single detector that is positioned before the sorting devices 30 and a counter (not shown) operatively connected to the conveyor 12 and processor for determining the position of an article along the path of travel. In this alternatively embodiment the detector 48 detects the presence of the article, such as by bar code or color code as described above, and the counter records the article's position. The processor determines which sorting device 30 is to sort that particular article, and the counter communicates with the processor so that the paddle 40 of the corresponding sorting device is moved across the conveyor 12 when the article is in a position to be swept. For example, suppose an article detected by the detector 48 is determined by the processor to be sorted at the third sorting device, and that the third sorting device is 150 counts by the counter from where the article is detected. In this example, the processor causes the third sorting device to sweep the article from the conveyor 12 when the counter reaches 150 counts from when the article was detected. This process can be performed for the remaining articles detected on the conveyor 12 so that each article is detected by the detector 48, and the processor, counter, and sorting devices communicate with one another to sweep the articles from the conveyor at the desired locations.

Thus, the sorting system 10 of the present invention is capable of sorting different articles to different totes as the articles are transported by the conveyor. In the following examples, which are for illustration purposes only, several different items, such as lipstick, shampoo, combs, and small boxes are desired to be sorted into corresponding totes, which receive the articles to fulfill customers' orders. In the first example, Customer Order #1 is for ten lipsticks, Customer Order #2 is for six shampoos, and so on.

| Sorting Device | Designated Color | Article | Quantity |
|---|---|---|---|
| 1 | red | lipstick | 10 |
| 2 | yellow | shampoo | 6 |
| 3 | blue | small box | 12 |
| 4 | green | comb | 4 |
| 5 | red | lipstick | 3 |

In this example, the articles are arranged by operators or by machine on the corresponding colored regions 50 of the conveyor 12 and moved down the predetermined path of travel. When the articles arrive at the first sorting device, ten lipsticks will be sorted into the chutes and the tote corresponding to the first sorting device. In particular, the processor is programmed to determine how many sorting operations are required by each sorting device, and the processor counts and controls each sorting action accordingly. Note that the shampoo will not be sorted by the first sorting device, as the first sorting device only sorts articles associated with the designated color red. Instead, the second sorting device sorts six shampoos to the corresponding chutes and tote. The process is similar for the third and fourth sorting devices. The fifth sorting device is also designated to sort articles associated with the color red. In this regard, the fifth sorting device will receive articles to sort after the first sorting device has fulfilled its requirement of ten articles. Alternatively, the system could be designed so that both the first and fifth sorting devices receive articles to sort. This may be advantageous where the first and fifth sorting devices sort the same article for different customers and it is desirable to fulfill both orders simultaneously.

In the second example, Customer Order #1 is for one lipstick, two combs, and ten small boxes. In this example, the processor causes the first sorting device to sort these items off one or both sides of the conveyor 12 into the first tote. When the items have been sorted into the tote, the tote can then be directed to downstream processing, or the sorted items can be removed from the tote and further processed to fulfill the order.

As has been shown and described, the system 10 and methods of the present invention overcome the disadvantages of conventional systems by providing a sorting system that is fast and efficient by providing a sorting device 30 having a single paddle 40 for sorting articles off either side of a conveyor toward a common discharge end 70. In this regard, the articles are sorted into one of a pair of opposing chutes 66, 68 that are in communication with one another that allow articles to be directed to a tote 90 via the discharge wall 71 of the discharge end 70. In addition, the system 10 provides at least one detector 48 for directly or indirectly detecting the presence of an article and sending signals to a processor for determining sorting actions by the sorting device. The system and methods of the present invention allow for more throughput and speed, which results in a more efficient sorting process.

Many modifications and other embodiments of the invention will come to mind to one skilled in the art to which this invention pertains having the benefit of the teachings presented in the foregoing descriptions and the associated drawings. For example, the system 10 could avoid providing a discharge wall, but may rather position the opening at the intersection of the lower walls such that articles sorted into the chutes fall through the opening to a tote, conveyor, or other object. Alternatively, the discharge wall may be in a fixed position and a release wall may be provided for sliding over the opening to open the discharge end. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A sorting system for sorting uniquely shaped articles, the system comprising:
    a conveyor for transporting the articles along a path of travel, said conveyor defining an external surface with a plurality of raised portions and a plurality of valleys between the raised portions, the raised portions being spaced apart to support the uniquely shaped articles;
    a sorting device positioned proximate said conveyor, said sorting device operable to move substantially perpendicular to the path of travel of the conveyor;
    at least one paddle having a proximal end connected to the sorting device, and a distal end; and
    a brush extending from the distal end of the at least one paddle, said brush operable to substantially contact both the raised portions and the valleys of the conveyor when said sorting device moves substantially perpendicular to the path of travel of the conveyor, so as to push the uniquely shaped articles from the conveyor.

2. A sorting system according to claim 1, wherein said conveyor is formed from a polymeric material.

3. A sorting system according to claim 1, wherein said brush includes a plurality of bristles formed from a polymeric material.

* * * * *